(12) United States Patent
Thannhuber et al.

(10) Patent No.: US 12,221,185 B2
(45) Date of Patent: Feb. 11, 2025

(54) PORTABLE STORAGE BATTERY, SERVER DEVICE AND ASSOCIATED OPERATING METHODS

(71) Applicant: EINHELL GERMANY AG, Landau/Isar (DE)

(72) Inventors: Markus Thannhuber, Landau/Isar (DE); Thomas Andorfer, Obertraubling (DE)

(73) Assignee: EINHELL GERMANY AG, Landau/Isar (DE)

( * ) Notice: Subject to any disclaimer, the term of this patent is extended or adjusted under 35 U.S.C. 154(b) by 594 days.

(21) Appl. No.: 17/608,307

(22) PCT Filed: Apr. 30, 2020

(86) PCT No.: PCT/EP2020/061991
§ 371 (c)(1),
(2) Date: Nov. 2, 2021

(87) PCT Pub. No.: WO2020/225076
PCT Pub. Date: Nov. 12, 2020

(65) Prior Publication Data
US 2022/0212741 A1    Jul. 7, 2022

(30) Foreign Application Priority Data
May 6, 2019    (DE) .................. 10 2019 111 636.8

(51) Int. Cl.
*H04W 12/08*    (2021.01)
*B62J 43/30*    (2020.01)
(Continued)

(52) U.S. Cl.
CPC ........... *B62J 43/30* (2020.02); *H01M 10/425* (2013.01); *H04W 12/08* (2013.01);
(Continued)

(58) Field of Classification Search
CPC ................. B62J 43/30; H01M 10/425; H01M 2010/4278; H01M 2220/20; H04W 12/08;
(Continued)

(56) References Cited

U.S. PATENT DOCUMENTS 9,182,244 B2    11/2015    Luke et al.
10,209,090 B2    2/2019    Luke et al.
(Continued)

FOREIGN PATENT DOCUMENTS

CN    105314039 A    2/2016
CN    109147197 A    1/2019
(Continued)

OTHER PUBLICATIONS

PCT; App No. PCT/EP2020/061991; International Search Report and Written Opinion mailed Aug. 10, 2020.
(Continued)

*Primary Examiner* — Justin Holmes
(74) *Attorney, Agent, or Firm* — FITCH EVEN TABIN & FLANNERY, LLP

(57) ABSTRACT

The invention relates to a portable storage battery, to an associated server device and to corresponding operating methods. The storage battery has a communication module for communicating with the server device and with a small vehicle, which can be operated by means of the storage battery. The storage battery is used as a key for enabling driving operation of the small vehicle. For this purpose, the storage battery transmits, in response to a corresponding authorization signal received from the server device, a corresponding enabling signal to the small vehicle.

15 Claims, 3 Drawing Sheets

(51) Int. Cl.
H01M 10/42 (2006.01)
H04L 67/12 (2022.01)

(52) U.S. Cl.
CPC .......... *H01M 2010/4278* (2013.01); *H01M 2220/20* (2013.01); *H04L 67/12* (2013.01)

(58) Field of Classification Search
CPC .......... H04L 67/12; B60L 53/65; B60L 53/80; B60L 2200/12; B60L 53/66; Y02T 10/70; Y02T 90/16
See application file for complete search history.

(56) References Cited

U.S. PATENT DOCUMENTS

| | | | |
|---|---|---|---|
| 10,807,475 B2* | 10/2020 | Carmignani | G01S 19/16 |
| 2013/0338865 A1 | 12/2013 | Kryze et al. | |
| 2017/0061709 A1 | 3/2017 | Toya | |
| 2019/0255963 A1* | 8/2019 | Goei | B60L 53/68 |

FOREIGN PATENT DOCUMENTS

| | | | | |
|---|---|---|---|---|
| DE | 102016116042 A1 * | 3/2018 | ......... | B60R 25/2018 |
| EP | 2716531 A1 | 4/2014 | | |
| WO | 2017068918 A1 | 4/2017 | | |
| WO | 2018127449 A1 | 7/2018 | | |
| WO | 2020044054 A1 | 3/2020 | | |

OTHER PUBLICATIONS

Dewalt. Inventory Management Solution, Internet, Dec. 31, 2017 (Dec. 31, 2017), Retrieved from the Internet: https://s3.amazonaws.com/sbd-docs/DEWALT/Product+Literature/DEWALT+Tool+Connect.pdf.

CNIPA; Chinese Office Action from Chinese Application No. 202080034107.1; Oct. 9, 2023 In Chinese with English Translation (20 pages).

CIPO; Canadian Office Action from Canadian Application No. 3,134,441; Nov. 23, 2022 (4 pages).

EPO; EP Office Action from EP Application No. 20 724 025.0; Sep. 7, 2023 In German with English Translation (20 pages).

* cited by examiner

PORTABLE STORAGE BATTERY, SERVER DEVICE AND ASSOCIATED OPERATING METHODS

CROSS-REFERENCE TO RELATED APPLICATIONS

This application is a U.S. national phase application of International Application No. PCT/EP2020/061991, filed Apr. 30, 2020, designating the United States, which claims priority to German Application No. 10 2019 111 636.8, filed May 6, 2019.

FIELD

The invention relates to a portable, thus hand-held or mobile, storage battery for an electric small vehicle, to a server device for communication with such a storage battery and to associated operating methods for the portable storage battery as well as for the server device.

BACKGROUND

Nowadays, there is a whole range of problematic trends and challenges, such as for example a finally not sustainable high consumption of resources and increasing environmental load. On the one hand, this results in the fact that a change of fossil fuels towards battery-electrical drives and appliances is sought in many technical fields. On the other hand, respective goals or purposes are to be achieved with less resources or more efficient resource usage at the same time.

SUMMARY

It is the object of the present invention to allow a particularly flexible use of portable storage batteries and electrical loads operable therewith. According to the invention, this object is solved by the subject matter of the independent claims. Advantageous configurations and further developments of the present invention are specified in the dependent claims, in the description and in the figures.

A portable storage battery according to the invention is a rechargeable energy storage, which can output electrical energy. Therein, the storage battery according to the invention can comprise one or more individual storage battery cells as well as one or more storage battery modules or cell modules of respectively multiple storage battery cells. The portable storage battery according to the invention is formed as an electrical energy source for at least one electric small vehicle, preferably for a fleet of electric small vehicles, which can also be different. Particularly preferably, the portable storage battery according to the invention can be formed not only for operating the electric small vehicle, but also for operating at least one electric tool.

That the storage battery according to the invention is portable means in terms of the present invention that an average human user can manually transport the storage battery. This can for example mean that the portable storage battery according to the invention can have a total mass of less than 25 kg, preferably of at most 10 kg or at most 5 kg. In addition, the portable storage battery according to the invention can have in each direction or dimension a maximum extent, thus length, of at most 1 m, preferably of at most 50 cm or at most 30 cm.

An electric small vehicle in terms of the present invention is an electrically operated or driven vehicle, which is provided and formed, thus serves, for transporting persons and/or goods. An electric small vehicle in this sense can for example be an electric scooter (e-footbike, e-scooter), an electric bicycle, an electric skateboard, an electric self-balancing means of passenger transport (such as for example known under the designation Segway), an electric unicycle, an electric rolling cart, hand cart, cart or transport cart (trolley), a go-kart, a golf-cart, a buggy, a rollator or the like. An electric small vehicle in terms of the present invention can for example be an electrically operated or operable vehicle with a total mass or an admissible total weight of at most 500 kg. Electric tools, which can also be operable by means of the storage battery according to the invention, can for example be electric lawn mowers, leaf blowers, saws, drilling machines, cordless screwdrivers and the like.

According to the invention, the portable storage battery comprises a communication module, thus a communication device (communicator), which is configured for cordless communication with a server device and for communication with the electric small vehicle. Such a communication can in particular include data transfer or data exchange. For example, the communication can be cordlessly effected via a respective mobile radio, WLAN, Bluetooth or low-energy radio link. Accordingly, the server device can be positioned independently of a respective site of the portable storage battery and/or of the respective small vehicle. Thus, the server device can for example be formed as a Cloud server or IT infrastructure backend, as a computing center or part of a computing center, as a server or server computer or the like.

The communication between the portable storage battery and the respective small vehicle can be effected in cordless or corded or wired manner. Thereto, the storage battery can for example comprise a communication interface with, in particular electrical, terminals or contacts accessible, thus contactable, from the outside, via which an electrical connection and/or data link to the small vehicle can be established. Therein, the communication with the small vehicle can be—in particular automatically—effected if the storage battery is for example located in the vicinity, thus approximately within a radius or a distance of for example less than 10 m or for example less than 50 cm to the small vehicle. Similarly, the communication between the storage battery and the small vehicle can be—in particular automatically—effected when or as soon as the storage battery is electrically connected to the respective small vehicle, thus for example is inserted in or into a corresponding storage battery receptacle of the small vehicle.

The communication module of the storage battery can be formed multi-part corresponding to these different functionalities and accordingly for example comprise multiple individual or different communication interfaces for different communications or types of communication. The different communications can be effected, thus performed, in automatic, partially automatic manner or manually initiated or caused by a user of the respective storage battery.

According to the invention, the portable storage battery is formed as a key for enabling or unblocking a driving operation of the respective electric small vehicle in that the storage battery, after it has received a corresponding authorization signal from the server device, is configured to automatically transmit a corresponding enabling signal for enabling the driving operation of the small vehicle to it. Therein, the authorization signal indicates an authorization for operating the small vehicle by means of the respective storage battery. Thus, the authorization signal can authorize or legitimate the individual storage battery or a user or owner of the storage battery, who is associated with the individual storage battery, for operating, thus for using, the respective small vehicle using the respective storage battery or signal a corresponding authorization.

In other words, it is thus provided that a user can carry the portable storage battery and then insert it into an electric small vehicle to use, in particular move, it. Therein, the storage battery serves not only as an electrical energy source for the respective electric small vehicle, but for enabling or unblocking the small vehicle or the driving operation thereof, as it is for example realized by a conventional ignition key in conventional motor vehicles. Conversely, this means that the small vehicle can be supplied with electrical energy upon a supply with electrical energy from a different energy source, for example a battery incorrectly connected to the small vehicle, different from the storage battery according to the invention, but cannot be further used, thus cannot be moved or driven, since the driving operation then is not enabled by the enabling signal.

In addition to the electrical or electronic enabling signal, similarly, mechanically enabling or unlocking can also be provided. Thereto, the portable storage battery and a corresponding storage battery receptacle of the electric small vehicle can be shaped matched with each other such that a mechanical blockage or lock is unlocked upon inserting the storage battery according to the invention into the storage battery receptacle of the small vehicle, which blocks the driving operation of the small vehicle without inserted storage battery.

Thus, the key functionality of the storage battery according to the invention presently provided allows startup of the respective electric small vehicle beyond a pure provision of electrical energy.

However, it can be provided that the storage battery, as soon as it is electrically connected to the respective small vehicle, provides electrical energy to it already independently of the authorization signal and the enabling signal. Thereby, a basic functionality or a basic operation, which does not include the driving operation of the small vehicle, can be ensured on the part of the respective small vehicle. Hereby, an improved or more detailed communication between the storage battery and/or the small vehicle on the one hand and the server device on the other hand can advantageously be allowed independently of a vehicle's own energy source of the small vehicle. This will be explained in more detail elsewhere.

Not least in response to the initially mentioned problems, nowadays, there are already approaches not only for electrically operated vehicles, but also for a shared use of vehicles determined by need by many users (car sharing). In a combination of these approaches, however, there is the challenge to comprehensively provide sufficiently charged electric vehicles for a reasonable use and to recharge the storage batteries thereof after an employment. In previous approaches, therein, each vehicle is equipped with an own storage battery, which necessitates expensive logistics and infrastructure and high employment of staff, for example to collect the vehicles for regularly charging and subsequently to distribute them again to suitable sites or borrowing places. An operator of a corresponding mobility platform, via which vehicles for use are provided, accordingly has to continuously get an overview of the state of charge of each individual one of the vehicles and continuously decide, which of the vehicles has to be when and where charged and/or positioned. Therein, physical controls at site are often required at the individual vehicles and vehicles with discharged storage battery optionally have to be transported to a charging station by additional collecting vehicles and corresponding personnel. Moreover, storage battery vandalism can be observed in practice, in which storage batteries of vehicles parked in the public space are damaged or improperly discharged. Therefore, with previous approaches, a comprehensive provision of reliably charged and usable electric vehicles can overall hardly be realized or only be realized with non-practicable cost and time expenditure.

The present invention solves these problems at least for electric small vehicles. By the above described equipment of the storage battery according to the invention with the communication module and the corresponding functionalities, the storage battery can communicate and exchange data with IT or telecommunication infrastructures and thereby be used as a key for example for borrowing, the startup and the driving operation, respectively, and generally the use of the electric small vehicle or of multiple corresponding provided electric small vehicles and/or other electric appliances or loads. Therein, it is provided that the battery is no longer provided and regularly charged by the respective electrical load, thus the respective electric small vehicle or appliance, or an operator of a corresponding electric mobility platform and/or electric appliance platform, but by the respective users themselves. In particular, this is allowed by the portability of the storage battery according to the invention. Thus, a range of responsibility, for example for charging of the storage battery or batteries, shifts from the respective vehicle or appliance provider or platform operator towards the users of the vehicles, of the appliances or of the platform. Advantageously, this results in a decentralized handling of the storage batteries, whereby the mentioned challenges and problems on the part of the storage batteries can be solved by means of the described technical measures and configurations. Since the storage batteries are carried by the users, the problems of storage battery theft or vandalism with respect to the storage batteries can also be solved or alleviated by the described technical configurations of the storage battery according to the invention.

Because the storage battery according to the invention is portable independently of the small vehicle and thereby is not fixedly installed or integrated in the respective small vehicle or another electrical load operable by means of the storage battery, the storage battery according to the invention can advantageously be flexibly used for different vehicles and appliances, thus loads. Thereby, an overall required number of storage batteries and charging devices can be reduced, which finally is resource-conserving and sustainable. In addition, an average degree of use of the storage battery and optionally of an associated charging device can be increased by this flexible usability, thus a corresponding compatibility of the portable storage battery with multiple identical or different loads. Advantageously, an increased resource or ecological efficiency is associated with an increasing degree of use.

In an advantageous configuration of the present invention, the storage battery comprises a recognizing device for automatically recognizing an electrical connection of the storage battery to the small vehicle. Therein, the storage battery is configured to automatically transmit a request for the authorization signal to the server device by means of the communication module upon corresponding recognition of such a connection. In other words, the storage battery automatically executes the communication with the server device as soon as it is inserted into the small vehicle, in particular into the storage battery receptacle thereof, and thereby is automatically connected to the small vehicle. Consequently, a user thus only has to insert the storage battery into the respective small vehicle for enabling the driving operation in the simplest case and wait for automatic enabling of the small vehicle. Advantageously, this can allow a use and application of the storage battery as well as of the small vehicle particularly simply and fast, in particular also for users technically not experienced. In addition, the communication between the storage battery and the server device as well as enabling of the small vehicle can be particularly safely performed since a respective user for example does not have to enter a potentially unsafe password. Instead, a code key for encrypting the communication between the storage battery and the server device can for example be recorded in a data memory of the storage battery. Preferably, it can be provided that users, who want to use a storage battery according to the invention for described enabling of the or a small vehicle—or generally of an electric appliance or load operable by storage battery—first have to log on or register. For example, this can be effected at or with respect to a provider or operator of the small vehicles and appliances, respectively, and/or the server device. Thereto, a corresponding user database can for instance be provided, in which corresponding user profiles are created and stored. This will be explained in more detail elsewhere. The registration or logon of the users and the corresponding user database, respectively, can then for example be used as a basis for ascertaining and/or administering the authorization for the respective user or storage battery.

The recognizing device can be or include an electrical or electronic circuit. Similarly, the recognizing device can be or include a signal and/or data processing device, which in turn can for example comprise a processor as well as a data memory with a corresponding program code or operating system executable by the processor. The recognizing device can include electrical contacts of the storage battery, via which the storage battery is connectable to the respective electric small vehicle, or be directly or indirectly connected to them in electrical manner and/or via a data line or data link. Thereby, the recognizing device can automatically recognize the insertion of the storage battery into the small vehicle, thus the electrical connection of the storage battery to the small vehicle, for example based on electrical signals or data signals occurring therein and/or based on data automatically received therein by the storage battery from the small vehicle. Thereto, preset reference signals or reference data can for example be recorded in the storage battery, which describe the electrical connection of the storage battery to the or a small vehicle or are to be expected therein. For example by a comparison to the recorded data or signal forms or corresponding preset threshold values, the electrical connection of the storage battery to the small vehicle can then be automatically recognized, thus detected. Thus, a so-called pairing of the storage battery with the small vehicle—or for example with a load or appliance of a preset list of loads or appliances—can be automatically monitored, thus recognized.

Particularly preferably, after the automatic recognition of the electrical connection of the storage battery to the small vehicle, the storage battery can be configured to first automatically examine if an authorization for operating the small vehicle by means of the storage battery is already present. Such an authorization can for example be recorded as a date, thus in data form, in the or a data memory of the storage battery. For example, such an authorization can already have been obtained and stored or noted in the storage battery at a respective earlier point of time, thus before the respective connection of the storage battery to the small vehicle. If a corresponding authorization is present, thus, the storage battery can preferably omit transmitting the request for the authorization signal to the server device and instead directly generate the corresponding enabling signal and transmit it to the respective small vehicle. This advantageously allows a particularly efficient and flexible use of the storage battery and of the small vehicle since the communication with the server device can be saved or bundled, for example if a license or authorization for one or more certain small vehicles and/or for a preset period of time is generally obtained and recorded in the storage battery. On the other hand, in this manner, the storage battery can advantageously be employed as a key for enabling the driving operation of the respective small vehicle as intended, even if a connection establishment, thus a communication with the server device, is not possible, for example caused by a site or a restricted network coverage. As described elsewhere, a previous registration or logon of the respective user of the storage battery can also be provided here. Based on corresponding user data, thus for instance logon or registration data, the authorization can then be ascertained, administered and/or assigned.

In an advantageous development of the present invention, the storage battery comprises a data memory connected to the communication module, in which an identifier is stored, which individually, thus uniquely, in particular biuniquely, identifies the respective storage battery. Therein, the storage battery according to the invention is configured to automatically transmit this identifier together with or as a part of the request for the authorization signal to the server device. In other words, the storage battery can thereby automatically identify itself with respect to the server device. Thereto, the identifier can be a number, for example recorded in the data memory by the manufacturer, or a corresponding code—also referred to as GUID (English: Global Unique Identifier). Then, the authorization signal can be specifically matched with this identifier, whereby it can be ensured that only the individually identified storage battery is authorized for operating the respective small vehicle. Hereby, the use of the storage battery and thereby the use of the small vehicle can be particularly safely configured since misuse can be prevented. In addition, the individual identifier on the part of the server device advantageously allows a particularly reliable and accurate administration of the storage batteries according to the invention, of the corresponding authorizations, of associated user profiles and the like, which is explained in more detail elsewhere. Therein, the identifier can advantageously also be transferred fast enough via data links of relatively low bandwidth such that a perceivable waiting time between the electrical connection of the storage battery to the respective small vehicle and a respective actual driving start does not arise for the respective user in practice. The data memory, in which the identifier is stored, can be a separate data memory or the data memory mentioned in context of one or more further configurations and developments of the present invention.

In further advantageous configuration of the present invention, the storage battery comprises a capturing device for automatically capturing its use for operating the respective small vehicle. The storage battery according to the invention is then configured to transmit corresponding use data describing the captured use of the storage battery to the server device by means of the communication module. In particular, the use data can indicate a respective use time, a respective use location and/or an amount of electrical energy and/or a power output to the small vehicle during the respective use. Therein, the use time can for example be indicated by a beginning and an end, thus a beginning time and an end time, or by a use duration. For example, the use location can be indicated by a respective administration region such as for instance a city, a commune or a county, where the respective use of the small vehicle occurs, by a postcode area, by one or more position data of a satellite-assisted positioning system (GPS data) and/or the like. The use data can be single data, in particular provided with timestamps, which indicates a respective capturing time of the use time or data points. Additionally or alternatively, the use data can be or include respective temporal courses, thus a respective use or operating profile. Similarly, the use data can for example be or include respective average values. Advantageously, a respective temporal course of the use data can make the use of the storage battery and the corresponding operation of the small vehicle, respectively, particularly accurately and reliably comprehensible. For example, this can allow improved planning, for instance for a distribution or positioning of a fleet of small vehicles, for charging thereof if they have additional own storage batteries, for maintenance of the small vehicles and/or for a technical design or further development of the or of future small vehicles. In contrast, indicating the use and the operation, respectively, in the form of individual data points or average data can advantageously reduce an amount of data to be transferred to the server device.

The use data can be continuously transmitted to the server device during the respective use. Advantageously, this can allow tracking of the small vehicles and of the operation thereof. Similarly, the use data can be transmitted to the server device in bundled manner, for example respectively after a preset use duration and/or at or after the end of the respective use or the respective operation of the small vehicle. This end can for example be indicated and correspondingly automatically recognized or detected by switching off or turning off or locking the respective small vehicle or by removing the storage battery from the respective small vehicle, thus disconnecting an electrical connection and/or a data link between the storage battery and the respective small vehicle. Such bundled transmission of the use data can advantageously reduce an energy demand for communicating the use data as well as a load of data networks or data links used thereto.

Correspondingly transferred, the same as for the described recognizing device for automatically recognizing the electrical connection of the storage battery to the small vehicle can apply to the capturing device. Thus, the capturing device can be or include a data processing device, a sensor technology and/or an electrical or electronic circuit, in particular a processor and a data memory connected thereto as well as a corresponding operating program, thus a corresponding program code and/or a corresponding hardware circuit. The capturing device and the recognizing device can be separate or combined with each other, thus for example share software and/or hardware resources, whereby the storage battery can advantageously be realized particularly efficiently.

The use of the storage battery for operating the small vehicle can for example be recognized and captured based on an energy output. Thereto, at least one energy or power threshold value can for example be preset, the exceedance of which, in particular after recognized connection of the storage battery to the small vehicle, can be interpreted as a use of the storage battery for operating the small vehicle. Similarly, data exchange, thus communication between the storage battery and the respective small vehicle, can occur, for example in the form of a communication of status indications, control commands, operating state data and/or the like, based on which the use of the storage battery for operating the small vehicle can then be recognized.

In further advantageous configuration of the present invention, the storage battery is configured to automatically retrieve operating data of the small vehicle from it by means of the communication module, while the storage battery is connected to the respective small vehicle, in particular electrically for supplying the small vehicle with operating energy and via a data link. Further, the storage battery is then configured to automatically transmit the retrieved operating data to the server device. For example, the operating data can be operating statistics, such as for instance respective operating durations of the small vehicle, traveled distances, speed profiles, shifting operations, error messages, servicing or maintenance data and/or the like or include corresponding indications. Based on this operating data, thus, monitoring of the small vehicles can be effected without respective personnel having to visit the small vehicles on site hereto to respectively manually read out the operating data. Advantageously, this can particularly simply and efficiently allow the monitoring, the operation and the servicing of a fleet of small vehicles. As described in context of the use data, the operating data can for example be transmitted to the server device in continuous or bundled manner. In that the operating data is transmitted to the server device by the storage battery, a corresponding transmitting device can advantageously be saved on the part of the small vehicles. Thereby, an overall ecological system of small vehicles and storage batteries provided for the operation thereof can be particularly inexpensively established and operated. In order to retrieve the operating data from the small vehicle, the storage battery can comprise a corresponding retrieving device, for example analogously to the recognizing device and the capturing device. Therein, the operating data can be retrieved via a corded or wired data link or via a cordless data link.

In further advantageous configuration of the present invention, the storage battery comprises an identifying device for identifying an electrical load respectively electrically connected to the storage battery. Such electrical loads, which can be operated with the storage battery, can for example be the electric small vehicle or different electric small vehicles, electric tools or other electric appliances. The identification of the respective load can for example mean or include recognizing or ascertaining the types or kinds thereof. Thereto, a respective identifier or signature can for example be retrieved or queried from the respective load by the storage battery. Similarly, an energy or power demand profile of the respective load electrically supplied by the storage battery can for example be analyzed to identify the load. Thereto, corresponding reference or comparison profiles and/or one or more threshold values for example for a power demanded by the load from the storage battery, a length and magnitude of current and/or voltage peaks, a corresponding average and/or minimum and/or maximum demand or the like can for example be recorded in the or a data memory of the storage battery. Based on this data, the respective load can then be automatically identified by an automatic comparison. According to the invention, after identifying the respective load, the storage battery is then configured to automatically retrieve an operating or application profile associated with this load and to automatically adjust at least one operating parameter of the storage battery as specified by the respectively retrieved operating profile. This can also be advantageous if the load can only be identified during the respective operation since the storage battery can then be operated with the respective associated operating profile at least for a remaining duration of the respective operation of the load. In other words, pairing or matching, thus association according to or specific to function or application, of the storage battery and the operating type or operating mode thereof, respectively, with the respective load or appliance is thus provided here. Since at least one characteristic or at least one property and thereby the operation of the storage battery can be adapted to the respective load in this manner, the safety and/or efficiency in using the storage battery for operating the respective load can finally be increased.

If an identification of the respective load is not possible, or for an initial operation up to a successful identification of the load and up to retrieval of the corresponding operating profile, the storage battery can advantageously be operated with a preset standard operating profile, which allows a safe storage battery operation independently of the load connected to or operated with the storage battery.

As the operating parameters, for example one or more switch-off thresholds, thus threshold values, upon reaching or exceeding of which the storage battery or an energy output of the storage battery to the load is automatically switched off, one or more threshold values for error detection, a maximum allowable voltage and/or current and/or power output of the storage battery, an operating temperature of the storage battery maximally allowable for a preset period of time, a current path to be used within the storage battery, an interconnection of individual cells or modules of the storage battery—for example in different configurations parallel, serially or mixed—voltage and/or current peaks automatically to be induced or provided by the storage battery upon a corresponding demand or occurrence of a preset signal form and/or the like can be indicated or recorded in the operating profiles. Thus, the storage battery can be adapted to the respective load with respect to its operating characteristics by the operating profiles. By such an optimized pairing between the storage battery and the operating profile of the storage battery, respectively, on the one hand and the respective electrical load on the other hand, a particularly safe and at the same time particularly comfortable and effective operation of the storage battery and the respective load can advantageously be achieved and ensured.

From experience, the same effects or states at different loads can for example suggest different, in particular differently dangerous, situations. Similarly, different environmental conditions can be associated with different loads. For example, upon using the storage battery for operating an electric small vehicle, a reliable cooling by airstream or a present cooling system of the vehicle can be assumed, which is not the case in using the storage battery for operating for example a drilling machine. Similarly, different load intensity profiles, thus different temporal courses of a load of the storage battery, can for example be assumed in different loads. For example from experience or application-related, different loads can for example have a permanently at least nearly constant power demand or an intermittently greater, but fluctuating power demand with relatively great power peaks interrupted by pauses or times of relatively low power demand. This can result in correspondingly different electrical and/or thermal loads of the storage battery. Therefore, in the former case, lower maximum allowable values can for example be provided for an operating temperature and/or a voltage, current or power output since the storage battery cannot regularly cool down or is not regularly relieved. Thus, an operation of the storage battery according to an operating profile respectively suitable for the operated load can finally also contribute to improved operational performances and lifetimes of the storage battery and the loads operated therewith.

In an advantageous development of the present invention, the storage battery is configured to automatically retrieve the respective operating profile from the server device. In other words, thus, multiple preset operating profiles for different loads can be recorded on the server device. Then, the storage battery can for example transmit the identification of the respective load together with a corresponding query for a suitable operating profile to the server device. In this development of the present invention, the different operating profiles thus advantageously do not have to be stored in the storage battery, whereby storage space and installation space in the storage battery can be saved and the operating profiles can be particularly simply and securely administered and updated in centralized manner.

Similarly, it is possible that the storage battery for example transmits a signal or operating progress captured for identifying the respective load to the server device. Based thereon, the server device can then identify the respective load and select a suitable associated operating profile and transmit it to the storage battery. Therein, advantageously, the load can optionally be more reliably identified and/or computing capacity can be saved on the part of the storage battery since more computing power is routinely available on the part of the server device than it is realizable in the portable storage battery in practicable manner.

In advantageous development of the present invention, the storage battery is configured to automatically retrieve the respective operating profile from the or a data memory of the storage battery. It can be a separate data memory or the data memory mentioned in context of one or more remaining developments or configurations of the present invention. In other words, multiple different operating profiles for different loads can thus be recorded in this data memory of the storage battery. These operating profiles can for example be preset by a manufacturer of the storage battery and/or be defined or adapted by a user of the storage battery.

By recording the operating profiles in the storage battery itself, an operation of the storage battery suitable for the respective load is advantageously also possible in situations, in which a connection to the server device cannot be established.

In further advantageous configuration of the present invention, the storage battery comprises an electronic control device for controlling a current output of the storage battery and/or for controlling an output voltage of the storage battery, thus a corresponding control logic. Analogously to the described recognizing, capturing, retrieving and identifying device, the control device can in particular be formed as a hardware circuit and/or as a data processing device with a processor and a data memory connected thereto and a corresponding operating program or program code. The control device can also be referred to as control unit or control. Therein, the control device is configured to automatically capture a temporal course, thus in particular a rise rate and an absolute and/or relative magnitude, of a current and/or voltage demand of an electrical load respectively operated with the storage battery. Therein, the load can be the respective electric small vehicle, an electric tool or another appliance electrically connected to the storage battery. Further, upon a corresponding demand peak, thus a peak in current, voltage and/or power, which are demanded from the storage battery by the respective load, in case that the demand peak goes beyond a normal value preset or automatically determined based on the captured progress, the control device is configured to associate the demand peak with one of multiple preset load profiles based on the respective progress. Preferably, these load profiles can be recorded in a or the mentioned data memory of the storage battery. Therein, different load profiles or sets of load profiles can preferably be preset and recorded for different appliances or loads. By the pairing between storage battery and respective load described elsewhere, thus for instance by identification of the respective load, the safety, reliability and user friendliness of the operation of the storage battery and of the operation of the respective load by means of the storage battery can advantageously be improved.

Furthermore, the control device is configured to automatically induce, thus effect, an increase of the current output and/or the output voltage of the storage battery preset by the respective load profile with respect to its temporal length and its magnitude for overcoming or serving the respective demand peak. In other words, the control device thus automatically recognizes and analyzes the current and/or voltage demand for overcoming specific obstacles or loads, which occur in the operation of the load. Conventional storage batteries or loads operated by storage battery typically immediately switch off the power supply as soon as an obstacle or resistance, thus a load or demand peak, occurs in the operation of the respective load. In contrast, it is presently provided that a corresponding current and/or voltage peak is induced, thus output, by the storage battery upon such a demand peak to avoid an interruption of the operation, thus switch-off, as possible and thereby to allow undisturbed work or undisturbed operation of the respective load. Therein, the corresponding increase of the current output and/or the output voltage can in particular be limited by the load profiles such that the storage battery is not damaged. Thus, by the increase, a preset threshold value for a permanent load of the storage battery can be exceeded for a relatively short time, for example for up to 10 s or for up to 3 s. By the use of the preset profiles and their selection specific to situation and/or appliance The load profiles can characterize different situations. In the small vehicle, this can for example be starting from standstill, an acceleration maneuver or activating an appliance or a circuit of the small vehicle. In an electric wood saw, a demand peak can for example occur if a saw blade reaches a knot hole or a growth defect or an enclosed foreign matter or the like in a wood piece or workpiece to be sawn. Analogously, different situations with demand peaks correspondingly different with respect to their temporal length, their magnitude and their rise rate can also be defined for other tools or appliances. In ideal case, thus, by the control device, current and/or voltage can be provided specifically to application or specifically to situation by the storage battery.

Preferably, at least three different load profiles can be preset. Therein, a first one of these load profiles is characterized by a relatively fast rising and relatively high power demand, respectively related to the normal value and/or the remaining load profiles. The first load profile, also referred to as surge current profile, can for instance be applied using the example of the electric saw if the saw blade encounters a metal bracket in the wood in sawing wood. Instead of then switching off the energy or power output, the obstacle can be overcome, thus for instance the metal bracket can be severed in the example, by a corresponding increase of the power output. In that the increase is limited by the load profile, a too long increased load, thus an overload of the storage battery, is avoided such that neither the storage battery nor the respective electrical load is damaged if the respective obstacle and thereby the demand peak cannot be overcome. This aspect too can be further improved by the described pairing or matching between storage battery and load, thus a corresponding association or adaptation.

A second one of the load profiles and a demand peak associated therewith, respectively, are for example characterized by a voltage peak at medium power demand, thus lower compared to the first load profile. The second load profile, also referred to as spike current profile, can for instance be applied using the example of the saw if the saw blade reaches a limb in a wood piece to be sawn. For overcoming the corresponding demand peak, therein, less power is required than for severing the exemplarily mentioned metal bracket in context of the first load profile, however, wherein the lower power demand for severing the limb has to be served over a longer period of time. This is also possible without damage due to the lower maximum load. If the load peak should not have been overcome after the maximum period of time specified by the second load profile for increasing the power output of the storage battery, thus the power demand should not return to the normal value, the power output can nevertheless be automatically again reduced to the normal value or the storage battery can be completely switched off to avoid an overload.

A third one of the load profiles and a demand peak associated with it, respectively, are for example characterized by a current peak at a power demand lower compared to the first and second load profiles. For example, this can occur if the saw blade reaches a growth defect in the wood piece to be sawn. The third load profile is also referred to as peak current profile.

Particularly preferably it is provided that the control device or control logic continuously compares the captured, thus measured, progress to the respective load profile or multiple or all of the preset load profiles and automatically changes the load profile if a better coincidence with another one of the load profiles is recognized. Additionally or alternatively, it can be provided that the control device terminates the increase of the power output or power provision if the captured progress cannot be associated with any one of the preset load profiles. In this manner, a damage of the respective load can be particularly reliably avoided.

In advantageous development of the present invention, the control device is configured to automatically limit the increase of the current output and/or of the output voltage of the storage battery to prevent exceedance of at least one limit value of the current, of the voltage and/or a of time-dependent energy input preset for the storage battery and/or for the respective load. For example, the time-dependent energy input can be given by the electrical power output by the storage battery and/or a thermal power arising therein. Thus, an electrical, correspondingly mechanical and/or thermal overload or damage of the storage battery, the load or optionally a processed workpiece can be avoided or limited. For example, the case can occur that the storage battery has been permanently operated at its load limit already before the respective demand peak. Fully utilizing or exhausting the current and/or output voltage increase preset by the load profile could then result in exceedance of the preset limit value such that the limit provided here can then intervene. Hereby, an optimum tradeoff between maximum power and user friendliness in the operation of electrical loads on the one hand and safety and long lifetime of the storage battery and of the respective load, respectively, are achieved.

Therein, the preset limit value can be a static value. Similarly, the preset limit value can be dynamically calculated and continuously updated during the operation of the load, thus during the use of the storage battery, for example depending on the ongoing load intensity. For example, if, at a certain point of time, the load in the respectively preceding period of time was relatively low, thus, the limit value can be increased. Conversely, the limit value can be automatically reduced after a period of time of relatively higher load.

A further aspect of the present invention is a server device, also briefly referred to as server, with a processor as well as with a memory and a communication interface, which are connected to the processor. Therein, a storage battery database is stored in the memory, in which storage batteries according to the invention are identified and the respective authorization of which for operating electric small vehicles—and optionally further loads—are administered. Therein, the server device is configured to communicate with the storage batteries in automatic or automated manner via the communication interface. Further, upon receiving a query for a respective authorization signal for operating an electric small vehicle by means of the respective storage battery, the server device is configured to identify the respective storage battery based on the query and the storage battery database, to adapt a corresponding entry for the corresponding authorization in the storage battery database and to transmit the respective authorization signal to the respective storage battery.

Particularly preferably, it can be provided that after identifying the storage battery, at least one preset authorization criterion is first examined and the authorization signal is only transmitted to the respective storage battery if the at least one authorization criterion is satisfied. Such an authorization criterion can for example be that a corresponding payment of the queried authorization or use has been effected, corresponding payment data is recorded, a respective approval of an owner or proprietor of the storage battery is present, the respective small vehicle is not already used or reserved by another user or the like. As already described elsewhere, it can also be provided hereto that the respective user first must have previously logged on or registered. Corresponding user data can then be used as a basis for examining the authorization criterion.

In particular, the server device according to the invention can be the server device mentioned in context of the storage battery according to the invention and/or further aspects of the present invention. Accordingly, the server device according to the invention can comprise one, some or all of the characteristics or features mentioned in context of the remaining aspects of the present invention. The storage batteries can for example be identified based on individual identifiers in the storage battery database. In order to be able to perform the described procedures, in particular in automatic or automated manner, the server device can comprise a data memory with a corresponding computer program or operating program, which is executable by the processor.

In advantageous configuration of the present invention, a user database is stored in the memory of the server device, which associates user profiles of logged on or registered users, thus for example proprietors or owners, of the storage batteries and the storage batteries with each other. Therein, the server device is configured to automatically note, thus to administer, a respective use of the storage battery in the respectively associated user profile. By the user database, a user-specific, thus person-specific, administration of the storage battery use and a corresponding use of small vehicles and/or other electrical loads is allowed. Advantageously, this can in turn result in an improved comfort of use with respect to an administration specific to storage battery for the users, in particular if the users each use multiple storage batteries. For example, the user profiles can respectively contain a name, contact or address data, billing or accounting data, a user history, appliances and/or storage batteries used and/or possessed by the user and/or the like for the users.

Particularly preferably, a vehicle database can also be stored in the memory of the server device, which identifies electric small vehicles operable with the storage batteries as well as optionally further electrical loads. In this vehicle database, corresponding vehicle data can also be administered, for example the use data and/or operating data mentioned in context of the storage battery according to the invention. Advantageously, this can allow a particularly reliable and efficient use and provision, thus maintenance, of a fleet of corresponding small vehicles.

In further advantageous configuration of the present invention, multiple operating profiles, which indicate different settings for at least one operating parameter of the storage batteries, are stored in the memory of the server device for different electrical loads operable by means of the storage batteries in a manner associated with them. Then, the server device is configured to automatically evaluate the query for identifying the respective load and, upon successful identification of the respective load, to automatically transmit the operating profile associated with the identified load to the respective storage battery. These operating profiles can in particular be the operating profiles already explained in context of the storage battery according to the invention with the corresponding characteristics and advantages.

A further aspect of the present invention is a method for operating a portable storage battery according to the invention. In this method, a query for an authorization for operating an electric small vehicle, thus for a corresponding authorization signal, is automatically transmitted to the server device according to the invention by the respective storage battery. If the corresponding authorization signal is received by the storage battery thereupon, the expanded enabling signal is automatically transmitted to the small vehicle by the storage battery to effect enabling of the driving operation of the respective small vehicle. The enabling signal can for example be a signal preset by the manufacturer and/or be generated from the authorization signal and thereby be individualized for the respective individual case of application. Procedures or operations described in context of the remaining aspects of the present invention can be further, possibly optional method steps of this method according to the invention.

A further aspect of the present invention is a method for operating a server device according to the invention. In this method, a query for an authorization of a storage battery according to the invention or of a user or owner of such a storage battery for operating an electric small vehicle is received via the communication interface of the server device. Thereupon, the respective storage battery is automatically identified based on the query and the storage battery database by the server device. Then, an authorization status associated with the respective storage battery is automatically adapted in the storage battery database by the server device—optionally only if the authorization criterion explained in context of the server device according to the invention is satisfied. Then, the corresponding authorization signal is automatically generated by the server device and transmitted to the respective storage battery via the communication interface, wherein the authorization signal indicates to the respective storage battery that the respective small vehicle is allowed to be operated by means of the storage battery. Further procedures or operations described in context of the remaining aspects of the present invention can be, possibly optional, further method steps of this method according to the invention.

A further aspect of the present invention is a computer program product, which includes commands or control instructions, which, upon execution of the corresponding computer program by a computer, in particular a processor of the storage battery according to the invention, cause it to execute the method according to the invention for operating the storage battery according to the invention. A further aspect of the present invention is a computer-readable storage medium, on which this computer program product according to the invention is stored.

A further aspect of the present invention is a computer program product, which includes commands or control instructions, which, upon execution of the corresponding computer program by the server device according to the invention, cause it to execute the method according to the invention for operating the server device according to the invention. A further aspect of the present invention is a computer-readable storage medium, on which this computer program product according to the invention is stored.

The invention also includes combinations of the described embodiments and developments.

Developments of the aspects according to the invention, which comprise features as they have been described in context of only one or some of the aspects of the present invention, also belong to the invention. In order to avoid unnecessary redundancy, here, the corresponding developments are not again separately described individually for all of the aspects of the invention.

BRIEF DESCRIPTION OF THE DRAWINGS

In the following, embodiments of the invention are described. Hereto, there show.

DESCRIPTION OF THE PREFERRED EMBODIMENTS

The embodiments explained in the following are preferred embodiments of the invention. In the embodiments, the described components of the embodiments each represent individual features of the invention to be regarded independently of each other, which also each develop the invention independently of each other and thereby are also to be regarded as a constituent of the invention in individual manner or in another combination than the shown one. Furthermore, the described embodiments can also be complemented by further ones of the already described features of the invention.

In many technical fields, the problems of scarce resources and a high resource consumption appear, which result in further shortage. The storage battery or battery technology and fields related thereto are an example hereto. Especially for the lithium ion technology widespread nowadays, a comparatively high resource usage is required, for instance for delivery, processing and refinement of raw materials, but also for ultimate appliance production intensive in terms of process energy. To make matters worse, a control or control logic, which controls a respective cooperation between storage battery or battery and appliance operated therewith, is usually installed in the respective appliance nowadays. Thus, although multiple appliances can be operated with a single storage battery, the control logic is thereby produced and installed not only once for this storage battery, but multiple times for the different appliances.

Figure 1:
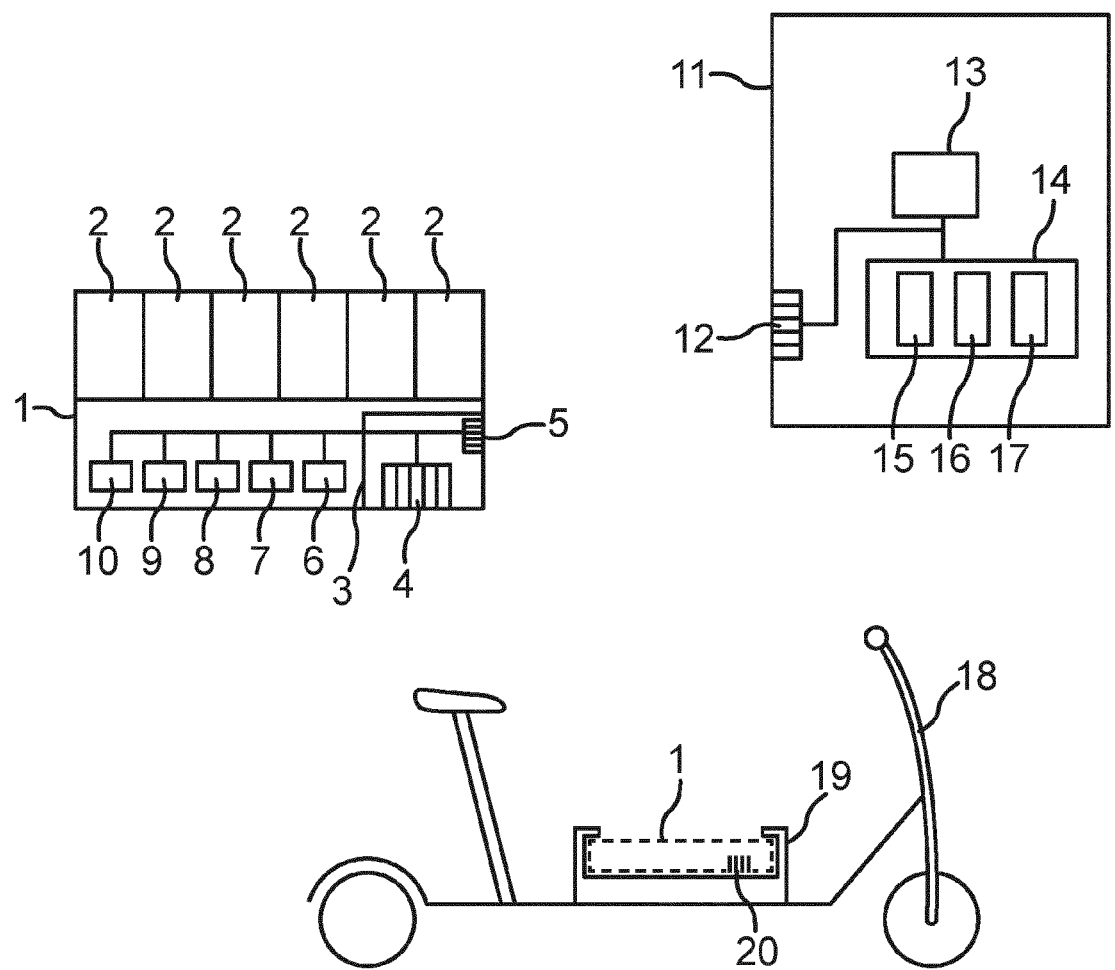
FIG. 1 a schematic overview illustration with a portable storage battery, an electric small vehicle operable therewith as well as a server, FIG. 2 an exemplary schematic flow chart with method steps for operating the elements illustrated in FIG. 1.

Presently, a platform, thus an ecological system of multiple appliances, is presented, within the scope of which different appliances can be operated with the same storage battery or with the same battery. Hereto, FIG. 1 schematically shows a corresponding rechargeable portable storage battery 1, a server 11, as well as an electric small vehicle 18 operable with the storage battery 1. Here, the latter is exemplarily formed as an electric scooter (e-scooter) and can be representative of a fleet of, optionally different, electric vehicles and other electrical loads, which are operable by means of the storage battery 1.

Here, the storage battery 1 exemplarily includes multiple cell modules 2 as well as a communication module 3. The communication module 3 in turn includes load terminals 4, by means of which an electrical connection and a data link can be effected or established between the storage battery 1 and an electrical load respectively operated therewith, thus presently exemplarily to the small vehicle 18. Moreover, the communication module 3 includes a radio interface 5, via which the storage battery 1 can cordlessly communicate with the server 11. Furthermore, here schematically indicated, the storage battery 1 comprises a recognizing device 6 for automatically recognizing a connection of the storage battery 1 to an electrical load, presently thus exemplarily to the small vehicle 18, an identifying device 7 for identifying the respectively connected load and a capturing device 8 for capturing a use of the storage battery 1 for operating the respective load.

Presently, a processor 9 and a data memory 10 connected thereto are also provided as a part of the storage battery 1. For example, the processor 9 can execute a program code and/or control commands of the devices 6, 7, 8 stored in the data memory 10. Moreover the storage battery 1 can comprise further components, in particular electrical and/or electronic members or circuits, which are not illustrated here for the sake of clarity. For instance, these components can be or include a current, voltage or power control. In other words, here, the storage battery 1 itself thus comprises the control logic for controlling the cooperation between the storage battery 1 and the respective load operated therewith. Accordingly, the small vehicle 18 can thus be manufactured without such a control logic and thereby in simpler, more inexpensive manner and with less resource usage than corresponding conventional electric vehicles.

The control logic installed in the storage battery 1, which is here to be schematically represented by the processor 9 and the data memory 10 as well as optionally by the devices 6, 7, 8, can for example include a circuit board manufactured by means of conventional technologies known per se, a corresponding chipset and/or the like. Since the control logic can therein be matched with the individual characteristics of the storage battery 1, thus adapted to it, and is always used or operated together with the individual storage battery 1, efficiency gains and a lower energy consumption can additionally advantageously arise by this arrangement.

The server 11 comprises a communication interface 12 for the cordless communication with the storage battery 1. Therein, the storage battery 1 can be representative of a plurality of storage batteries 1, which can all be employed for operating the small vehicle 18. Further, the server 11 comprises a server processor 13 and a memory 14 connected thereto. Presently, a storage battery database 15, a user database 16 and a vehicle database 17 are stored in the memory 14. In addition, a program code or operating system for operating the server 11, which can be executed by the server processor 13, is stored in the memory 14.

Presently, the small vehicle 18 comprises a storage battery receptacle 19 with terminals 20 for receiving and connecting the storage battery 1. Here, the position of the storage battery 1 in the storage battery receptacle 19 is schematically indicated. The small vehicle 18 can comprise further components not illustrated in detail here, such as for example electrical and electronic components, a data processing device and/or the like. Some or all of these components can be connected via the terminals 20. In addition, an electric motor of the small vehicle 18 can be electrically connected via the terminals 20 such that the small vehicle 18 can be driven by the storage battery 1 and the electric motor with the storage battery 1 inserted into the storage battery receptacle 19.

Figure 2:
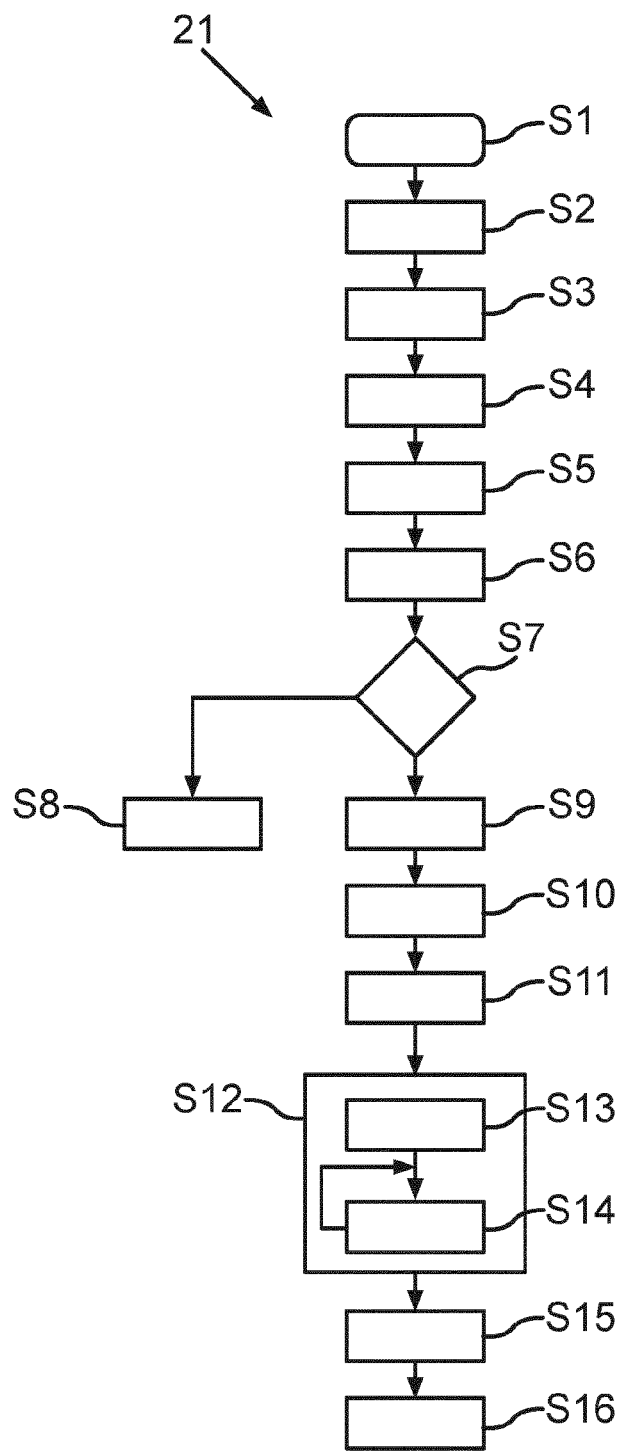

FIG. 2 exemplarily shows a schematic flow chart 21, based on which an operation and cooperation of the storage battery 1, the server 11 and the small vehicle 18 is to be explained in the following.

In a method step S1, the storage battery 1, the server 11, the preset data stored therein and the small vehicle 18 or a corresponding fleet of small vehicles 18 are provided. In a method step S2, a user of the storage battery 1 can logon to and register with the server 11 as such and is then identified and associated with the storage battery 1 in the storage battery database 15 and the user database 16, respectively.

In a method step S3, the storage battery 1 is inserted into the storage battery receptacle 19 of the small vehicle 18 by the user and an electrical connection and a data link between the storage battery 1 and the small vehicle 18 is established thereby.

In a method step S4, this connection of the storage battery 1 to the small vehicle 18 is automatically recognized by the recognizing device 6. In addition, the small vehicle 18 is identified, for example as an electric small vehicle, specifically as an e-scooter or even more concretely as a certain model or as an individual single vehicle, by the identifying device 7.

In a method step S5, the storage battery 1 automatically transmits a query for an authorization, thus a corresponding authorization signal, which indicates an authorization of the storage battery 1 or of the user of the storage battery 1 for operating the identified small vehicle 18 by means of the storage battery 1, to the server 11 via the communication module 3. As a part of this query, the identification of the small vehicle 18 and an individual unique identifier of the storage battery 1 are transmitted to the server 11.

In a method step S6, the server 11 receives this query and identifies the storage battery 1, the user thereof and the small vehicle 18 based on the query and the databases 15, 16, 17, for example by an automatic comparison. Therein, a current site of the storage battery 1 and thereby also of the small vehicle 18 can similarly be transmitted by the storage battery 1 and be received by the server 11 as part of the query. This site can be recorded and compared to a site respectively lastly stored for the small vehicle 18 for plausibility check.

In a method step S7, an examination is automatically performed by the server 11, for example of a preset authorization criterion and/or the mentioned site plausibility. If a discrepancy results therein or if the user of the storage battery 1 or the storage battery 1 is not authorized to operate the small vehicle 18 and if such an authorization either cannot be obtained or assigned, thus, the method is aborted in a method step S8. Therein, a corresponding notification about the discrepancy or lack of authorization can be transmitted to the storage battery 1 and/or to a communication appliance, for example a mobile phone, of the user of the storage battery 1, whose corresponding address or contact data can be stored in the user database 16.

In contrast, if a discrepancy or inconsistency has not been determined in method step S7 and the examined authorization criterion is satisfied, thus, the authorization is automatically noted in the databases 15, 16, 17 by the server 11 in a method step S9, thus the databases 15, 16, 17 are automatically updated.

In a method step S10, the server 11 generates a corresponding authorization signal, which indicates the authorization of the storage battery 1 or of the user of the storage battery 1 for operating the small vehicle 18 by means of the storage battery 1, and transmits this authorization signal to the storage battery 1 via the communication interface 12.

In a method step S11, the storage battery 1 receives the authorization signal and generates a corresponding enabling signal and transmits this enabling signal to the small vehicle 18 for enabling a driving operation of it. The enabling signal can be transmitted via the load terminals 4 or the radio interface 5, for example according to equipment of the small vehicle 18.

In a method step S12, the user can operate the small vehicle 18 by means of the storage battery 1. Preferably, it is provided that multiple operating profiles for different electrical loads, which are operable by means of the storage battery 1, thus presently for example for different small vehicles 18, are stored in the memory 14 of the server 11. The server 11 then ascertains, for example also in method step S10, a suitable operating profile, thus associated with the identified small vehicle 18, and transmits it to the storage battery 1 together with the authorization signal. The storage battery 1 receives this operating profile and automatically adjusts at least one operating parameter as indicated by this operating profile in a method step S13.

During the operation, a current, voltage and power demand of the small vehicle 18 is automatically monitored and analyzed by the storage battery 1, in particular by the mentioned control logic of the storage battery 1. Upon a demand or load peak going beyond a normal demand, the storage battery 1 automatically associates it with one of multiple preset load profiles, for example recorded in the data memory 10, and automatically increases a current output, an output voltage provided at the load terminals 4 and/or a power output of the storage battery 1 to the small vehicle 18 corresponding to the respective load profile to overcome, thus to serve, the respective demand peak and thereby to allow an operation of the small vehicle 18 as uninterrupted as possible complying with preset safety threshold values. This can be continuously effected during the entire operation of a respective electrical load by means of the storage battery 1, which is here schematically indicated by a loop-shaped arrow or program path.

During the operation of the small vehicle 18 by means of the storage battery 1, use data of the storage battery 1 as well as operating data of the small vehicle 18 can additionally be captured and recorded. In a method step S15, for example at the end of operation, the storage battery 1 automatically transmits this use and operating data to the server 11.

In a method step S16, the transmitted use and operating data is administered by the server 11, for example entered into the databases 15, 16, 17 and analyzed. As needed, an indication signal for an optionally required maintenance of the small vehicle 18 can then for example be generated and transmitted to an operator of the server 11 and/or of the small vehicle 18.

Figure 3:
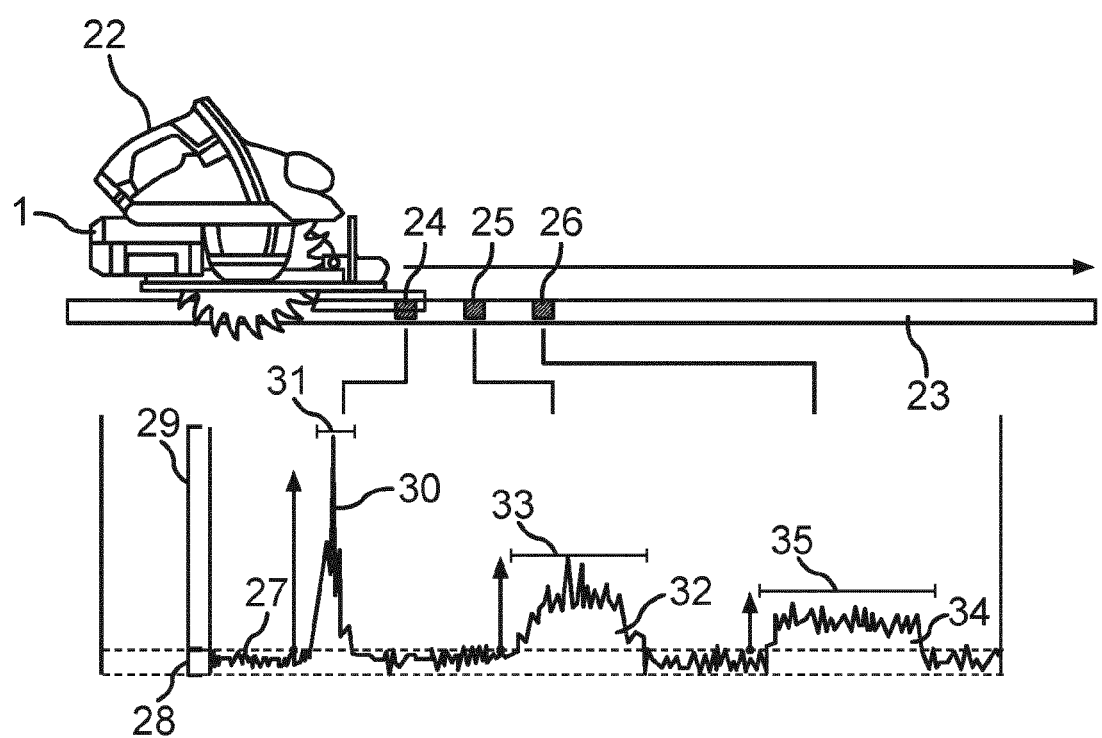
FIG. 3 a schematic representation for illustrating various loads.

FIG. 3 shows a schematic overview illustration for exemplifying the method step S14, here using the example of an electric tool 22 operated by means of the storage battery 1. Presently, the electric tool 22 is exemplarily an electric circular saw, by means of which a workpiece 23, for example a wood plate, is to be sawn. Therein, multiple obstacles 24, 25, 26 are in the workpiece 23 in sawing direction, thus in movement direction of the electric vehicle 22. Here, an associated power demand 27 of the electric tool 22 in sawing the workpiece 23 is additionally plotted over the time. Therein, outside of the obstacles 24, 25, 26, the power demand 27 of the electric vehicle 22 moves in a normal range 28. However, as soon as the electric tool 22 respectively encounters one of the obstacles 24, 25, 26, an increased power demand 27 for overcoming these obstacles 24, 25, 26 arises, whereby the power demand 27 increases beyond the normal range into an increase range 29.

Presently, the obstacles 24, 25, 26 differ from each other. Accordingly, upon reaching the first obstacle 24, a first demand peak 30 with a certain height, a certain rise rate of the power demand 27 and a certain temporal first length 31 arises. Upon reaching the second obstacle 25, a second demand peak 32 arises, which differs from the first demand peak 30 in its characteristics. Thus, the second demand peak 32 is for example characterized by a flatter, more irregular rise as well as a lower maximum height and has a temporal second length 33, which is greater than the first length 31. Upon reaching the third obstacle 26, a still different third demand peak 34 with a temporal third length 35 arises, which is longer than the second length 33.

The control logic of the storage battery 1 can recognize characteristics of the respective demand peaks 30, 32, 34 and associate them with corresponding preset load profiles and for example, according to the respective load profile, automatically control the current output, output voltage and/or power output of the storage battery 1 according to the respective load profile. Therein, the normal range 28 can in particular be exceeded for a period of time preset by the respective load profile and depending on the respective maximum current, voltage and/or power output. This is an advantage over conventional storage batteries, in which the demand peaks 30, 32, 34 would for example result in automatically switching off the storage battery 1 due to their exceedance of the normal range 28.

Presently, the first demand peak 30 can for example be associated with the above mentioned surge current profile, the second demand peak 32 can be associated with the spike current profile and the third demand peak 34 can be associated with the peak current profile. In that the storage battery 1 can automatically induce a power output increased beyond the normal range 28 at least respectively for a relatively short time, the obstacles 24, 25, 26 and thereby the corresponding demand peaks 30, 32, 34 can thus be overcome and the workpiece 23 can be completely sawn through. Therein, preset limits or threshold values for a load of the storage battery 1 can still be monitored and complied with to overall achieve a tradeoff between an operation as gentle as possible and effective work with the electric tool 22.

Even if for example the small vehicle 18 is operated by means of the storage battery 1 instead of the electric tool 22, similar obstacles, resistances or situations with corresponding load peaks going beyond a corresponding normal range can analogously arise, which can then be handled by the storage battery 1 in corresponding manner.

The flow chart 21 and the method steps S1 to S16 thereof, respectively, can be completely or partially computer-implemented, thus for example represent corresponding functional blocks or program modules of a respective computer program product or operating system of the storage battery 1 and the server 11, respectively.

In summary, using the appliances and measures described here, a platform or an ecological system for electric mobility can be realized. Therein, a corresponding platform operator can for example provide a fleet of small vehicles 18 for borrowing for users. Therein, these small vehicles 18 advantageously do not have to be equipped themselves with a respectively own energy storage and an associated control logic. For use, thus for the operation, of the small vehicles 18, the respective users can each use one of the storage batteries 1 formed as a key for the small vehicles 18, which can optionally control the cooperation of the storage battery 1 with the respective small vehicle 18 based on demand and situation by its integrated control logic. In that the storage battery 1, upon its insertion into the respective small vehicle 18, provides electrical energy to it and optionally enables the driving operation of the respective small vehicle 18 under communication or consultation with the server 11, the storage batteries 1 thus function as keys for the use of the small vehicles 18 offered via the platform.

Therein, the storage batteries 1 can particularly advantageously be employed not only for operating the small vehicles 18, but for example also for operating electric tools 22 and thus are particularly flexibly and versatilely usable.

By the communication between the storage battery 1 and the server 11, the respective use can for example be captured and billed with respect to the respective user via the server 11 or a corresponding IT infrastructure. Therein, the storage batteries 1 can be property of the respective user, of the platform operator or of a storage battery manufacturer and then be temporarily obtained by the respective user for example for a rental charge. Due to the portability of the storage batteries 1, this is advantageous over small vehicles fixedly equipped with batteries or storage batteries with respect to a reliable usability of the small vehicles 18. For example, the server 11 can be a Cloud server, a computing center or a part of such one.

With such an IT infrastructure, besides administration of owner, use, storage battery and vehicle data, offer or use of further services is advantageously also allowed. For example, they can be or include encryption for a secure communication, for example satellite-assisted localization, use or compensation accounting, appliance monitoring for instance with respect to efficiency, defects and servicing intervals and/or the like.

It can be provided that a respective user or owner of the storage batteries 1 has to register with the server 11 or a corresponding platform operator, as described, for using the described functions. Therein, a corresponding owner status can be ensured by a combination of a personalized registration and a respective unique storage battery identifier of the storage batteries 1. Monitoring and accounting of the use can be effected accurately in time and/or accurately in load via the server 11 or the corresponding IT infrastructure since corresponding use times, for example logon and logout times, as well as corresponding operating and use data can be captured and administered.

By the described operating or application profiles, matching between the respective storage battery 1 and the respective electrical load, thus for example the small vehicle 18 or the electric tool 22, improved over conventional systems is additionally advantageously allowed. Therein, the storage battery 1 can automatically recognize and consider a respective situation, thus a respective load or demand profile, based on the respective electrical load and/or corresponding operating data. According to situation, employment or load operated by means of the storage battery 1, very high powers or a constant permanent operation at lower power level can for example be required for a short time. A corresponding adaptation of the operation of the storage battery 1 can consider this and contribute to improved efficiency and lifetime. In order to ensure operating safety, therein, preset threshold values can always be taken into account, upon the exceedance of which for example automatic switch-off can be effective. However, which loads or progresses of load peaks therein signal a case of failure, can depend on the respective situation and the respectively operated load. By identifying the respectively operated load as well as the load or situation recognition based on the progress of the power demand, the current demand and/or the voltage demand, the respective limit or threshold value, the exceedance of which results in automatic switch-off, can be advantageously dynamically adapted. Thereby, a more flexible, more reliable and more comfortable use of the storage battery 1 is overall allowed.

The invention claimed is:

1. A portable storage battery for an electric small vehicle, comprising:
   a communication module, which is configured for cordless communication with a server device and for communication with the small vehicle,
   wherein the storage battery is formed as a key for enabling a driving operation of the small vehicle in that the storage battery is configured to, after it has received a corresponding authorization signal indicating an authorization for operating the small vehicle by operation of the storage battery from the server device, automatically transmit a corresponding enabling signal for enabling the driving operation of the small vehicle to it;
   wherein the storage battery, as soon as it is electrically connected to the small vehicle, provides electrical energy to the small vehicle independently of the authorization signal and the enabling signal.

2. The storage battery according to claim 1,
   wherein the storage battery comprises a recognizing device for automatically recognizing an electrical connection of the storage battery to the small vehicle and is configured to automatically transmit a request for the authorization signal to the server device by operation of the communication module upon corresponding recognition of such a connection.

3. The storage battery according to claim 2,
   wherein the storage battery comprises a data memory connected to the communication module, in which an identifier is stored, which individually identifies the storage battery, and the storage battery is configured to automatically transmit the identifier together with or as part of the request for the authorization signal.

4. The storage battery according to claim 1,
   wherein the storage battery comprises a capturing device for automatically capturing its use for operating the small vehicle and is configured to transmit corresponding use data, which describes the captured use of the storage battery, to the server device by operation of the communication module,
   wherein the use data indicates a respective use time, a respective use location and/or an amount of electrical energy and/or a power output to the small vehicle during the respective use.

5. The storage battery according to claim 1,
   wherein the storage battery is configured to automatically retrieve operating data of the small vehicle from it by operation of the communication module, while the storage battery is connected to the small vehicle, and to automatically transmit the operating data to the server device.

6. The storage battery according to claim 1,
   wherein the storage battery comprises an electronic control device for controlling a current output of the storage battery and/or an output voltage of the storage battery,
   wherein the control device is configured:
      to automatically capture a temporal course of a current and/or voltage demand of an electrical load respectively operated with the storage battery,
      upon a corresponding demand peak, which goes beyond a normal value preset or automatically determined based on the captured progress, to associate the demand peak with one of multiple preset load profiles based on the progress, and
      for overcoming the demand peak, to automatically induce an increase of the current output and/or the output voltage of the storage battery beyond the normal value preset by the respective load profile with respect to its temporal length and its magnitude.

7. The storage battery according to claim 6,
   wherein the control device is configured to automatically limit the increase of the current output and/or the output voltage of the storage battery to prevent exceedance of at least one limit value of the current, the voltage and/or a time-dependent energy input preset for the storage battery and/or for the respective load.

8. A method for operating a portable storage battery according to claim 1, the method comprising:
   automatically transmitting a query for an authorization for operating an electric small vehicle to a server device by the storage battery, and
   in response to a corresponding authorization signal being received by the storage battery thereupon, automatically transmitting an enabling signal to the small vehicle by the storage battery to effect enabling of a driving operation of the small vehicle.

9. A server device comprising:
   a processor;
   a memory and a communication interface, which are connected to the processor,
   wherein a storage battery database is stored in the memory, in which storage batteries according to claim 1 are identified and the respective authorization of which for operating electric small vehicles is administered, and
   wherein the server device is configured:
      to communicate with the storage batteries via the communication interface,
      upon reception of a query for a respective authorization signal for operating an electric small vehicle by the respective storage battery, to identify the respective storage battery based on the query and the storage battery database, to adapt a corresponding entry for the corresponding authorization in the storage battery database and to transmit the respective authorization signal to the respective storage battery.

10. The server device according to claim 9,
wherein a user database is stored in the memory of the server device, which associates user profiles of registered users of the storage batteries and the storage batteries with each other, and the server device is configured to automatically note a respective use of the storage batteries in the respectively associated user profile.

11. The server device according to claim 9,
wherein multiple operating profiles, which indicate different settings for at least one operating parameter of the storage batteries, are stored in the memory of the server device for different electrical loads operable by the storage batteries in a manner associated with them, and the server device is configured to automatically evaluate the query for identifying the respective load and to automatically transmit the operating profile associated with the identified load to the respective storage battery upon successful identification.

12. A method for operating a server device according to claim 9, the method comprising:
receiving a query for an authorization of a storage battery or of a user of such a storage battery for operating an electric small vehicle via the communication interface of the server device,
thereupon, automatically identifying the respective storage battery based on the query and the storage battery database by the server device,
automatically adapting an authorization status associated with the respective storage battery in the storage battery database by the server device, and
automatically generating and transmitting a corresponding authorization signal to the respective storage battery via the communication interface by the server device, wherein the authorization signal indicates to the respective storage battery that the respective small vehicle is allowed to be operated by the storage battery.

13. A portable storage battery for an electric small vehicle, comprising:
a communication module, which is configured for cordless communication with a server device and for communication with the small vehicle,
wherein the storage battery is formed as a key for enabling a driving operation of the small vehicle in that the storage battery is configured to, after it has received a corresponding authorization signal indicating an authorization for operating the small vehicle by operation of the storage battery from the server device, automatically transmit a corresponding enabling signal for enabling the driving operation of the small vehicle to it;
wherein the storage battery comprises an identifying device for identifying a load respectively electrically connected to the storage battery, and after identifying the respective load, is configured to automatically retrieve an operating profile associated with this load and to automatically adjust at least one operating parameter of the storage battery as indicated by the respectively retrieved operating profile.

14. The storage battery according to claim 13,
wherein the storage battery is configured to automatically retrieve the respective operating profile from the server device.

15. The storage battery according to claim 13,
wherein the storage battery is configured to automatically retrieve the respective operating profile from a data memory of the storage battery.

* * * * *